(12) United States Patent
Frimann

(10) Patent No.: US 11,008,661 B2
(45) Date of Patent: May 18, 2021

(54) PORTABLE ELECTROLYZER AND ITS USE

(71) Applicant: FRIMANN INNOSWISS, St. Gallen (CH)

(72) Inventor: Michael Frimann, St. Gallen (CH)

(73) Assignee: FRIMANN INNOSWISS, St. Gallen (CH)

( * ) Notice: Subject to any disclaimer, the term of this patent is extended or adjusted under 35 U.S.C. 154(b) by 90 days.

(21) Appl. No.: 16/084,084

(22) PCT Filed: Mar. 8, 2017

(86) PCT No.: PCT/EP2017/055496
§ 371 (c)(1),
(2) Date: Sep. 11, 2018

(87) PCT Pub. No.: WO2017/157745
PCT Pub. Date: Sep. 21, 2017

(65) Prior Publication Data
US 2019/0390354 A1    Dec. 26, 2019

(30) Foreign Application Priority Data

Mar. 14, 2016 (WO) .................. PCT/IB2016/000307

(51) Int. Cl.
*C25B 1/04* (2021.01)
*C25B 9/00* (2021.01)
(Continued)

(52) U.S. Cl.
CPC .................. *C25B 1/04* (2013.01); *C25B 9/00* (2013.01); *C25B 9/01* (2021.01); *C25B 9/015* (2021.01);
(Continued)

(58) Field of Classification Search
CPC .. C25B 1/10; C25B 1/12; C25B 15/02; C25B 11/03; C25B 9/00; C25B 9/01
See application file for complete search history.

(56) References Cited

U.S. PATENT DOCUMENTS

| 4,184,931 A | 1/1980 | Inoue |
| 5,989,407 A | 11/1999 | Andrews et al. |

(Continued)

FOREIGN PATENT DOCUMENTS

| RU | 2 299 930 C1 | 5/2007 |
| WO | WO 89/06711 A1 | 7/1989 |

(Continued)

OTHER PUBLICATIONS

Häussinger et al., "Hydrogen, 2. Production", Ullmann's Encyclopedia of Industrial Chemistry, vol. 18, Oct. 15, 2011, pp. 249-307.

(Continued)

*Primary Examiner* — Nicholas A Smith
(74) *Attorney, Agent, or Firm* — Birch, Stewart, Kolasch & Birch, LLP

(57) ABSTRACT

A portable electrolyzer includes an electrolyze chamber with an anode and a cathode as electrodes, a membrane, a water source, such as a water storage vessel, a gas tank, a gas compressor, an electric power supply, and a pulse-width modulator. The electrolyzer further includes i) a thermoelectric cooler attached to the electrolyze chamber and/or a gas tank, ii) an ultrasonic generator connected to at least one electrode and/or at least one sonotrode, and/or iii) a mixer capable of mixing the aqueous phase inside the electrolyze chamber. A process to generate and store hydrogen with the electrolyzer, the use of the electrolyzer e.g. for welding with a hydrogen flame, to convert electricity from renewable energies into hydrogen and to store said electricity in the form of hydrogen, and/or for heat generation by burning (Continued)

Figure 1:
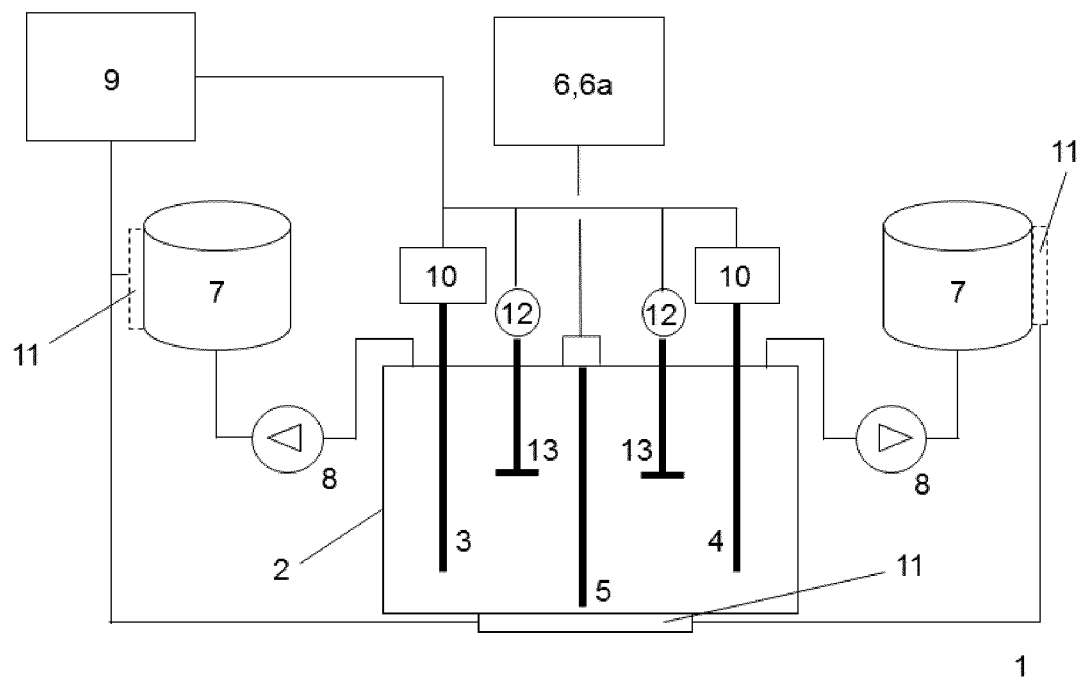

hydrogen in a porous burner are also disclosed. Furthermore, a blowtorch including the electrolyzer is disclosed.

20 Claims, 5 Drawing Sheets

(51) Int. Cl.
    *C25B 11/02*     (2021.01)
    *C25B 15/02*     (2021.01)
    *F02B 51/00*     (2006.01)
    *F23D 14/38*     (2006.01)
    *C25B 9/73*     (2021.01)
    *C25B 9/01*     (2021.01)
    *C25B 11/03*     (2021.01)
    *C25B 9/015*     (2021.01)

(52) U.S. Cl.
    CPC ............... *C25B 9/73* (2021.01); *C25B 11/02* (2013.01); *C25B 11/03* (2013.01); *C25B 15/02* (2013.01); *F02B 51/00* (2013.01); *F23D 14/38* (2013.01)

(56) References Cited

U.S. PATENT DOCUMENTS

| | | | |
|---|---|---|---|
| 2004/0040838 A1* | 3/2004 | Helmke | .................... C25B 9/08 204/275.1 |
| 2006/0060464 A1 | 3/2006 | Chang | |
| 2009/0115190 A1* | 5/2009 | Devine | .................... F17C 3/025 290/44 |
| 2011/0042203 A1* | 2/2011 | McAlister | ................. C25B 1/04 204/238 |
| 2011/0132751 A1* | 6/2011 | Smedley | ................. C25B 15/00 204/274 |
| 2014/0001035 A1* | 1/2014 | Kelly | ...................... C25B 15/02 204/252 |
| 2014/0245974 A1 | 9/2014 | Elsarrag et al. | |
| 2015/0292380 A1* | 10/2015 | Ballinger | .............. F01N 3/0892 429/422 |

FOREIGN PATENT DOCUMENTS

| | | |
|---|---|---|
| WO | WO 01/27037 A1 | 4/2001 |
| WO | WO 2008/118088 A1 | 10/2008 |
| WO | WO 2010/084358 A2 | 7/2010 |
| WO | WO 2014/064470 A1 | 5/2014 |

OTHER PUBLICATIONS

International Search Report (PCT/ISA/210) issued in PCT/EP2017/055496, dated Apr. 10, 2017.

Written Opinion (PCT/ISA/237) issued in PCT/EP2017/055496, dated Apr. 10, 2017.

* cited by examiner

PORTABLE ELECTROLYZER AND ITS USE

The present invention relates to a portable electrolyzer, process to generate and store hydrogen with the electrolyzer, use of the electrolyzer and blowtorch comprising the electrolyzer.

Molecular hydrogen, also known as hydrogen gas, $H_2$, and cited in the present application also just as hydrogen, is widely used for a number of applications and uses. In recent years, molecular hydrogen has gained—and will gain in future—new relevance as energy carrier, e.g. in fuel cells, due to climate change and its demand for reduced consumption of natural sources of hydrocarbons. Furthermore, hydrogen is highly suitable for welding, since the hydrogen flame with air has a temperature of 2130° C. and with pure oxygen even 3080° C., while only water—and no carbon dioxide—is produced.

Known methods for industrial manufacture of hydrogen include steam reforming and partial oxidation of natural gas or bio gas with water, petrochemical processes as well as metal oxide processes. A further suitable method to generate hydrogen is the electrolysis of water with electricity, which is mostly performed on industrial scale due to higher efficiency. Water electrolysis splits water into oxygen and hydrogen, most typically with electric power and two electrodes. However, this process is cost intensive and thus less preferred on an industrial scale.

WO-A-2014/064470, WO-A-2010/084358 and WO-A-01/27037 disclose an electrolyzer comprising a pulse-width modulated power supply. However, they are silent about a thermoelectric cooler, an ultrasonic generator, a sonotrode as well as about a mixer capable of mixing the liquid phase inside the electrolyze chamber.

WO-A-2008/118088 relates to a gas reactor adapted to produce hydrogen and oxygen from water, but is silent about disclosing a thermoelectric cooler, in particular one attached directly to the electrolyze chamber and/or gas reactor. Furthermore, it does not disclose an ultrasonic generator, a sonotrode nor a mixer capable of mixing the liquid phase inside the electrolyze chamber.

WO-A-89/06711 discloses an electrolytic cell and an apparatus comprising said electrolytic cell, the electrolytic cell comprises a plurality of cell units, each cell unit consisting of a first electrode having a generally tubular configuration with open ends, and a second electrode of rod-like configuration located substantially coaxially within said first electrode to define a substantially annular space there between. However it is silent about a membrane, in particular a membrane separating the electrodes from each other. Therefore, no gas separation takes place. Furthermore, it does not disclose an ultrasonic generator, a sonotrode nor a mixer capable of mixing the liquid phase inside the electrolyze chamber.

RU-C-2 299 930 discloses an electrolyzer for producing hydrogen and oxygen by electrolysis of electrolyte solutions in a centrifugal field. It is, however, silent about a thermoelectric cooler, a sonotrode as well as about a mixer capable of mixing the liquid phase inside the electrolyze chamber.

However, when hydrogen is produced on large, industrial scale, hydrogen needs to be transported to the widely spread end-users. Due to the hazard of hydrogen, in particular its possibility to react extremely heavily with oxygen, special care must be taken when handling and transporting hydrogen. And since hydrogen is a gas with a very low boiling point, it only can be stored in sufficient density as compressed gas, which itself bears hazards—in particular for transport and transfer of hydrogen from one pressure cylinder to another one.

Therefore, for moderate hydrogen consumption electrolysis is still prevailing, disregard its economical drawbacks. The disadvantages are not only based on the cost of electric energy, but also upon the cost of the separating membranes, which are expensive and prone to deterioration. Additionally, the process of water electrolysis has often—and in particular at small scale—a poor efficiency, which is an additional cost-driver.

Moreover, a problem for small scale, portable electrolyzers, i.e. electrolyzers for field application, is the limited temperature range the system might be operated within, since the power consumption increases with higher temperature of the electrolyte solution. Thus, water for hydrolysis must preferably be around room temperature, whereas water might be freezing in winter. The hydrolytic process is as well breeding heat, partially due to the Joule heating effect, but must first commence. In hot environment overheating the unit might therefore as well become a problem.

Therefore, there is a need for efficient, small scale hydrogen production at the location of hydrogen consumption and thus locally. Furthermore, said hydrogen production unit should be in the form of a portable, i.e. mobile, production unit, allowing hydrogen production basically at any place, in particular at the place of its use.

The problem to solve is therefore to provide a portable electrolyzer to electrolyze water with high efficiency and store the thus generated hydrogen conveniently, if required. Thus, means of enhancing the efficiency of water splitting and collecting the obtained hydrogen and optionally oxygen in such a small and portable electrolyzer unit need to be provided.

Surprisingly it was found that this object can be solved by a portable electrolyzer (1) comprising
- an electrolyze chamber (2) with an anode (3) and a cathode (4) as electrodes (3,4),
- at least one membrane (5),
- a water source (6), in particular a water storage vessel (6a),
- at least one gas tank (7),
- at least one gas compressor (8)
- an electric power supply (9), and
- a pulse-width modulator (10),
- wherein that the electrolyzer (1) further comprises
  - i) one or more thermoelectric cooler (11), wherein one side of the thermoelectric cooler (11) is directly attached to the electrolyze chamber (2) and/or a gas tank (7),
  - ii) one or more ultrasonic generator (12), wherein at least one ultrasonic generator (12) is connected to at least one electrode (3,4) and/or at least one sonotrode (13), wherein the sonotrode (13), if present, and the electrodes (3,4) are placed inside the electrolyze chamber (2), and/or
  - iii) a mixer (14) capable of mixing the aqueous phase inside the electrolyze chamber (2).

Claimed also is a process to generate and store hydrogen with the electrolyzer (1) according to the invention, wherein water is electrolyzed in the electrolyzing chamber (2) with the anode (3) and the cathode (4) as electrodes (3,4) upon applying the electric power supply (9) and the pulse-width modulator (10), separating and releasing hydrogen using a membrane (5), compressing the obtained hydrogen with the gas compressor (8) to collect said hydrogen in a gas tank (7), wherein i) at least one thermoelectric cooler (11) is connected to the electrolyze chamber (2) and/or the gas tank (7), wherein process heat from the electrolyze chamber (2) and/or the gas tank (7) is transformed into electricity by the thermoelectric cooler (11) and the obtained electricity is further used while operating the electrolyzer (1), in particular by feeding said electricity back fed into the electric power supply (9), into an accumulator, to power electric engines such as the gas compressor (8), pulse-width modulator (10), ultrasonic generator (12), sonotrode (13), and/or to feed the electricity into another thermoelectric cooler (11) dedicated to transform electricity into heat and thus to warm up its environment, in particular the water source (6) in cold environment, ii) the ultrasonic generator (12) transmits the ultrasonic vibrational energy generated to the sonotrode (13) and thus into the electrolyze chamber (2) to reduce or inhibit bubble cavitation and thus to facilitate the liberation of formed gas bubbles, and/or iii) the mixer (14) mixes the aqueous solution inside the electrolyze chamber (2), wherein the mixer (14) is optionally coupled and accelerated by a microactuator (18).

Claimed is also the use of the electrolyzer (1) according to the invention and the use of the hydrogen generated and stored according to the process according to the invention for welding with a hydrogen flame, to convert electricity from renewable energies, such as photovoltaic elements, into hydrogen and thus to store said converted electricity in the form of hydrogen and optionally oxygen, and/or for heat generation by burning hydrogen in a porous burner.

Additionally, claimed is also a blowtorch comprising the electrolyzer (1) according to the invention and a tip of a blowtorch (16) with connecting tubes to the gas tank (7) and preferably a back-pressure valve and/or a gas control valve per tube.

The electrolyzer (1) according to the invention and the process according to the invention surprisingly have many advantages. Due to the presence of the pulse-width modulator (10), the thermoelectric cooler (11), and/or the ultrasonic generator (12) and the sonotrode (13), efficiency of the electrolyzer (1) is highly increased and heat loss reduced, i.e. process heat may be transformed back into electricity. Bubble cavitation is reduced or even inhibited and formed gas bubbles are liberated easily. Thus, efficiency is significantly increased, which is of most importance for small electrolyzers. And due to its small and compact design, the electrolyzer (1) is portable and thus can be easily transported to the location of its use and the consumption of hydrogen.

The electrolyzer (1) according to the invention may furthermore easily be transformed into a blowtorch (16) with its own hydrogen generation and with which hydrogen may be burned. Thus, the hydrogen generated with the electrolyzer (1) and with the process according to the invention may be burned in a hydrogen flame, e.g. at the tip of a blowtorch (16) with oxygen from air and/or with pure oxygen, e.g. generated, collected and stored by the electrolyzer (1). Said hydrogen flame may be generated to provide a high temperature of more than 2000° C.—when burned with air—or of even more than 3000° C.—when burned with pure oxygen. Hence, a portable, i.e. easy movable, blowtorch is provided with integrated and optionally instant hydrogen and potentially oxygen generation, allowing melting, cutting and/or welding at fast feed rates materials such as metals, e.g. steel, even at high thicknesses.

Furthermore, the electrolyzer (1) may also be well placed e.g. at remote locations to store produced electricity from e.g. renewable resources at remote locations, and to transform the hydrogen back into electricity e.g. in a fuel cell, upon its need. This allows remote locations being independent from external electricity, also for longer periods without sufficient power generation.

Although some propositions are known to enhance the efficiency of water electrolysis, i.e. of electrolytic water splitting, the pulse-width modulation of the electric current for the electrodes (3,4) in combination with i) a thermoelectric cooler (11) attached to the electrolyze chamber (2) and/or a gas tank (7), hence the recovery, i.e. recuperation, of thermal process energy, ii) an ultrasonic generator (12) being connected to at least one electrode (3,4) and/or at least one sonotrode (13), i.e. the application of ultrasonic vibration for higher yield of the water electrolysis, i.e. the produced gases, and/or iii) a mixer (14) capable of mixing the aqueous phase inside the electrolyze chamber (2) are unknown. Furthermore, a concentric alignment of electrodes with separating membranes in between, or furnishing the electrodes with apertures, i.e. punctuating the electrodes, for homogeneous distribution of the electrolyte, i.e. catalyst, such as alkali hydroxide or acid, is unknown as well.

The Electrolyzer (1)

The electrolyzer (1) according to the invention is a portable, i.e. a mobile or carry-on, electrolyzer (1). Thus, it also can be named to be an electrolyzer (1) for field applications.

In order to a portable electrolyzer (1), the electrolyzer (1) has preferably an empty weight, i.e. a weight without water and/or gas, of up to 50 kg, preferably up to 20 kg, in particular up to 10 kg, and most preferably up to 5 kg.

The electrolyzer (1) possesses most preferably a static arrangement, i.e. it does not comprise a rotating—in particular not a centrifugating—electrolyzing chamber (2).

Electrolyzer (1) most typically does not comprise a fuel cell. The gases produced by the electrolyzer (1), however, may well be fed into an external fuel cell, which may be connected to the electrolyzer (1).

The electrolyzer (1) is most typically a water electrolyzer, i.e. the materials are designed to electrolyze water to form hydrogen, $H_2$, and oxygen gas, $O_2$ and referred to in the present application also just as oxygen. However, the electrolyzer (1) according to the invention is not limited to hydrolyse water. Therefore, the electrolyzer (1) may be used to electrolyze other liquids, if adapted accordingly.

In order to electrolyze water, the electrolyze chamber (2) of the electrolyzer (1) is charged with water. Most preferably, the electrolyze chamber (2) comprises a polymer electrolyte membrane or proton exchange membrane (PEM) and thus the electrolyze chamber (2) may be equipped with a solid polymer electrolyte (SPE). Alternatively, or in addition, the electrolyze chamber (2) may comprise an aqueous electrolyte solution, in particular an aqueous electrolyte solution with an alkali hydroxide, most preferably about a 15 to 30 wt.-% sodium or potassium hydroxide solution, or an acidic aqueous solution, such as aqueous sulfuric acid. Furthermore, said aqueous electrolyte solution may optionally also comprise one or more defoamers.

The temperature of the electrolysis to be performed in the electrolyzer (1) is basically only limited by the employed types of materials. However, a suitable temperature for water hydrolysis in the electrolyzer (1) may be between e.g. about 10° C. to about 150° C., preferably between about 25° C. and about 110° C., and in particular between about 60-95° C.

The electrolyzer (1) according to the invention comprises an electrolyze chamber (2) with an anode (3) and a cathode (4), together named electrodes (3,4), at least one membrane (5), a water source (6), in particular with a water storage chamber (6a), at least one gas tank (7), at least one gas compressor (8) to feed generated gas into the gas tank, an electric power supply (9) and a pulse-width modulator (10). Furthermore, the electrolyzer (1) comprises one or more thermoelectric cooler (11) and/or an ultrasonic generator (12) and a sonotrode (13).

The Electrolyze Chamber (2)

The electrolyzer (1) may comprise one or a multitude, i.e. two or more, electrolyze chambers (2). However, it is often preferred that the electrolyzer comprises one electrolytic chamber (2), i.e. electrolytic cell.

In a preferred embodiment, the volume of the one electrolyze chamber (2) or of the sum of the multiple electrolyze chambers (2) ranges from about 0.1 $dm^3$ to about 0.5 $m^3$, preferably from about 0.5 $dm^3$ to about 0.2 $m^3$, and particular from about 2 $dm^3$ to about 0.1 $m^3$.

The shape of the electrolyze chamber (2) is not limited. However, in many cases is a rectangular or circular shape preferred.

The electrolyze chamber (2) comprises an anode (3) and a cathode (4) as electrodes (3,4). Furthermore, the electrolyze chamber (2) comprises preferably a membrane (5) suitable for electrolysis, in particular for water electrolysis.

In order to electrolyze water, the electrolyze chamber (2) is essentially filled with water or a premixed, aqueous catalyst solution, i.e. at least 60 vol.-%, preferably at least 70 vol.-%, and in particular at least 80 vol.-%, of the electrolyze chamber (2) is filled with water or an aqueous solution, respectively.

In another preferred embodiment, the electrolyze chamber (2) is made of—or inside the chamber (2) coated with— non-conducting materials such as glass, polymer and/or polymer composite or composites.

The Anode (3) and the Cathode (4), i.e. the Electrodes (3,4)

The anode (3) and the cathode (4), together called electrodes (3,4), are most typically commercial electrodes. Preferably, they are designed to allow a current density of around 0.15 to 0.5 $A/cm^2$.

The electrodes (3,4) are connected to the electric power supply (9) via the pulse-width modulator (10). Furthermore, an ultrasonic generator (12) may optionally be placed between the electrodes (3,4) and the electric power supply (9), either before or after the pulse-width modulator (10).

In one preferred embodiment, the electrodes (3,4) are arranged concentrically around each other. Thus, the electrodes (3,4) may be cylinder electrodes having different diameters and arranged one inside the other electrode (3,4), wherein the outer electrode (3,4) may be the anode (3) or the cathode (4). Such a concentric design facilitates—among others—the central heat concentration around a recuperating heat absorber which may be connected to a thermoelectric cooler (11).

In another preferred embodiment, the electrodes (3,4) are punctuated hollow cylinders, i.e. circular electrodes comprising apertures.

In even another preferred embodiment, the electrodes (3,4) exhibit a thin-walled areal shape, preferably with apertures, i.e. punctuated cylinders, wherein the electrodes (3,4) may be optionally shaped, in particular curved, i.e. bent, wherein one, i.e. outer, electrode (3,4) is arranged around the other, i.e. inner, electrode (3,4) and thus dividing the electrolyze chamber (2) into an inner section a) confined essentially by the other electrode (3,4) and optionally part of the wall of the electrolyze chamber (2), an intermediate section b) between the electrodes (3,4) and optionally part of the wall of the electrolyze chamber (2), and an outer section c), confined by the one electrode (3,4) and at least part of the wall of the electrolyze chamber (2), wherein, when the electrolyze chamber (2) comprises water, all sections a), b) and c) comprise water. The one, i.e. outer, electrode (3,4) is either the anode (3) or the cathode (4), while the other, i.e. inner, electrode (3,4) is the cathode (4) or the anode (3), i.e. the inner electrode (3,4) is the complementary electrode to the out electrode (3,4). The electrodes (3,4) of this embodiment divide the electrolyze chamber (2) into the sections a), b) and c), as shown in FIG. 7b and FIG. 7c.

The electrodes (3,4) preferably comprise one or more apertures to allow equilibration of the aqueous solution between the sections a), b) and c). Said apertures may be located at the bottom of the electrodes (3,4). Alternatively— or in addition—water may be fed from the water source (6) to the sections a), b) and c) according to their water level. Said apertures, i.e. punctuation, of the electrodes (3,4), also cause fluid mechanical turbulence around the edges of each hole, which locally mixes the solution and contributes to keeping the catalyst homogeneously distributed in the reactor, so to ensure a balanced electrical conductivity between the electrodes.

Suitable electrodes (3,4), i.e. anode (3) and cathode (4), including electrodes (3,4) exhibiting a thin-walled areal shape, are known to the skilled person in the art and commercially available. Non-limiting examples of preferred electrodes (3,4) include carbon electrodes, titanium/silver, nickel-lanthanum-perovskite alloy, nickel-cobalt-spinel alloys, Ni—Co—Zn or Ni—Mo alloys and/or platinum. Preferred anodes (3) are made of nickel-lanthanum-perovskite or nickel-cobalt-spinel alloys and preferred cathodes (4) are made of Ni—Co—Zn or Ni—Mo alloys.

The Membrane (5)

The electrolyzer (1) according to the invention comprises at least one membrane (5). The membrane (5) is preferably a semipermeable membrane or diaphragm suitable for electrolysis, in particular water electrolysis, and/or a gas separating membrane, in particular a ceramic-metal composite, i.e. cermet, membrane.

The membrane (5) may be placed inside the electrolyze chamber (2) to separate the electrolyze chamber (2) into two sections, each section having one of the electrodes (3,4), i.e. the anode (3) or the cathode (4). For this arrangement, it is often preferred when the membrane (5) separates the electrolyze chamber (2) completely, i.e. from bottom to top and from one side to the other. The membrane (5) in this arrangement is preferably a semipermeable membrane or diaphragm suitable for electrolysis such as water electrolysis. Suitable membranes (5) are known to the skilled person in the art and commercially available. Non-limiting examples include fluoropolymer membranes such as sulfonated tetrafluoroethylene based fluoropolymer-copolymers, known also under the tradenames Nafion, Aciplex, Flemion, Dowew, and fumapem F.

According to the invention, the membrane (5) for separating the electrodes (3,4) from each other may be made of semipermeable membrane or diaphragm material only. Alternatively, the term membrane (5) may stand for a frame, e.g. a cylindrical frame, with apertures, wherein these apertures are covered with said semipermeable membrane or diaphragm material.

In a further preferred embodiment, the membrane (5) is placed inside the intermediate section b) of the electrolyze chamber (2) and thus dividing the intermediate section b) into an inner intermediate section $b_1$) between the membrane (5) and the inner electrode (3,4) and an outer intermediate section $b_2$) between the membrane (5) and the outer electrode (3,4). Thus, the membrane (5) may be arranged—typically in equidistance—between the two concentric cylinder electrodes which may be punctuated, wherein the punctuation of each cylinder allows the produced gases to escape through the electrode wall. This arrangement allows using the membrane (5) most economically. In this embodiment, the membrane (5) may have—when placed in the electrolyze chamber (2)—a circular, oval or rectangular form, as e.g. illustrated in FIG. 7b. Furthermore, the membrane (5) may be arranged in equidistant formation between the electrodes (3,4).

The membrane (5) separating the electrodes (3,4) preferably comprises one or more apertures to allow homogenization of the aqueous solution between the sections a), b) and c). Said apertures may be located at the bottom of the membrane (5). The sizing of the apertures may be balanced against the surface area of the electrodes in order to allow sufficient flux of produced gases.

In another preferred embodiment, there is no membrane (5) separating the electrodes (3,4) from each other. Thus a gas mixtures is produced, e.g. in water electrolysis a mixture of hydrogen and oxygen. The obtained gas mixture may be used as such, although it is generally preferred—also due to safety reasons—to separate hydrogen from oxygen most typically in the electrolyze chamber (2) and thus before transport into the gas tank (7). For separating the gases, a gas-separating membrane (5) is used, e.g. arranged at each gas outlet. A preferred gas-separating membrane (5) is a ceramic-metal composite membranes, also named "cermet membranes" suitable to separate—for water electrolysis—hydrogen from oxygen. Suitable gas-separating membranes (5) are known to the skilled person in the art and commercially available.

Furthermore, it is possible to employ both arrangements, a membrane (5) such as a semipermeable membrane or a diaphragm which separate the electrodes (3,4) from each other, as well at least one gas-separating membrane (5).

In a preferred embodiment, the separating membrane (5), i.e. the semi-permeable or diaphragm membrane (5), is arranged as central structure between two concentric electrodes (3,4).

Water Source (6), in Particular a Water Storage Vessel (6a)

The electrolyzer (1) according to the invention comprises a water source (6) which is connected to the electrolyze chamber (2) and which allows easy refill of the electrolyze chamber (2) with water. Most typically, there is a valve between the water source (6) and the electrolyze chamber (2) to regulate the water refill. Such mechanisms and valves are known to the skilled person in the art and commercially available.

The water source (6) may be a water storage vessel (6a), a water hose and/or a water pipe. A preferred water source (6) is a water storage vessel (6a). This arrangement allows the electrolyzer (1) to work independent from a permanent water source. Hence, the electrolyzer (1) can be transported and get into work basically anywhere, in particular with a mobile electric power supply, such as a battery. Water may be refilled upon use. Thus, the size of a water storage vessel (6a) depends on the specific needs and the time of operation independent from new water addition.

The water storage vessel (6a), if present and if used in freezing environment, may be equipped with a heating element, e.g. heating coil, and/or may be surrounded with thermal insulation material.

The water may be fed from the water source (6), e.g. from the water storage vessel (6a), into the electrolyze chamber (2) through one or multiple lines. If it is fed through one line only, it can most typically pass from one of the sections a), b) and c) to another one in order to equilibrate the water level inside the various sections. Furthermore, the transfer of the water from the water source (6) into the electrolyze chamber (2) is preferably controlled e.g. by a filling level control device. Suitable filling level control devices are known to the skilled person in the art and commercially available.

Gas Tank (7)

The electrolyzer (1) according to the invention comprises at least one gas tank (7). The at least one gas tank (7) is connected to the electrolyze chamber (2) via a compressor (8). Preferably, the gas outlet in the electrolyze chamber (2) towards the gas tank (7) is place in the upper area of the electrolyze chamber (2), e.g. in its cover, i.e. casing (19). Optionally, a gas-separating membrane (5), such as a cermet membrane, may be placed at said gas outlet. The gas tank (7) may be equipped with a manometer and/or a pressure relief valve.

For water electrolysis, one gas tank (7) is designated to store hydrogen. Another gas tank (7) may be used to store oxygen. Alternatively, oxygen may be released through a valve to the environment, i.e. the air. The gas tanks (7) for hydrogen and oxygen may be of the same or different type, size and/or material. Suitable gas tanks to store hydrogen and/or oxygen are known to the skilled person in the art and commercially available. For instance, a suitable hydrogen gas tank may be a low pressure tank, e.g. up to 10 bars, or high pressure tank, e.g. up to 700 bars. They may be made from steel, aluminum, composite material such as fiberglass/aramid, carbon fibers with e.g. a metal liner, and/or prepregs, i.e. preimpregnated fibers.

Gas Compressor (8)

The electrolyzer (1) according to the invention comprises at least one gas compressor (8) to compress and feed the resulting gas—in water electrolysis at least hydrogen and optionally oxygen—into the gas tank (7) or gas tanks (7). Hence, the compressor (8) is connected to the electrolyze chamber (2) and the gas tank (7). When more than one gas tank (7) is present, each gas tank (7) is connected to a compressor (8)—either each gas tank (7) to one dedicated compressor (8) or more than one gas tanks (7) to one compressor (8) through a switch. Most typically, a back-pressure valve is placed between the gas tank (7) and the electrolyze chamber (2). Said back-pressure valve is typically part of the compressor (8) and acts typically as a spark arrestor.

Suitable gas compressors (8) are known to the skilled person in the art and commercially available. Non-limiting examples of suitable compressors include dynamic compressor, centrifugal compressor, axial compressor, positive displacement compressor, reciprocating compressor, diaphragm compressor, double acting compressor, single acting compressor, rotary compressor, lobe compressor, screw compressor, liquid ring compressor, scroll compressor and/or vane compressor.

Electric Power Supply (9)

The electrolyzer (1) according to the invention comprises at least one electric power supply (9). The power supply (9) is connected to the electrodes (3,4) and allows conducting the electrolysis and thus it has an on/off switch and can be preferably regulated manually and/or electronically. Preferred power supplies (9) include a battery, an accumulator, a power outlet and/or one or more photovoltaic elements, i.e. photovoltaic panels, wherein a battery and/or an accumulator are particularly preferred. Preferably, the power supply (9) provides an electrical potential of around 1.23 V.

Pulse-Width Modulator (10)

The electrolyzer (1) according to the invention also comprises at least one pulse-width modulator (10), shortened with PWM. It is connected between the electric power supply (9) and the electrodes (3,4), i.e. the anode (3) and the cathode (4). The pulse-width modulator (10) generates, upon producing pulses of suitable frequencies, an electromagnetic field which enhances the efficiency of the water electrolysis cell.

Thus, the operating current on the electrodes (3,4) of the electrolyzer (1) is generated from the pulse-width modulator (10), i.e. from a pulse-width-modulated power supply.

According to the invention, the electrolysis is preferably governed by pulse-width modulation of most typically a rectangular signal, that is provided to enhance the production of excited "Ortho"-hydrogen, as to Tikhonov, V. I. and Volkov, A. A. in "Separation of Water into its Ortho and Para Isomers", Science (2002) 296 (6677):2363, doi: 10,1126/science. 1069513. PMID 12089435, wherein the high, molecularly parallel spin-state renders an increased release of energy by subsequent oxidation/combustion of the hydrogen gas, hence the thermodynamical and electrochemical efficiency of the electrolyzer is improved. Since the produced hydrogen in the here invented system may be applied in situ and without thermal or pressure stress, the interconversion from the ortho- into para-form, together with its energy loss that usually happens in hydrogen storage, remains low.

Thermoelectric Cooler (11)

In one particularly preferred embodiment according to the invention, the electrolyzer (1) comprises one or more thermoelectric cooler (11), shortened with TEC and also known as Peltier element, Peltier device, Peltier heat pump and solid state refrigerator. It is used—according to the invention—to transfer a temperature difference to electricity or vice versa.

Said thermoelectric cooler (11) allows optimizing the thermal management of the electrolysis. Thus, energy from the process heat, that results from water splitting, may be transformed into electrical energy, which may be stored in a battery, an accumulator, in a further thermoelectric cooler (11) to heat up respectively de-ice in cold environment the water in the water storage vessel (6a) or which may be used directly to power an electric engine such as a compressor.

Thus, the process heat is in one embodiment preferably recycled, i.e. transformed, into electric energy by at least one thermoelectric cooler (11), i.e. Peltier element.

In another embodiment, regained, i.e. transformed electrical energy by a thermoelectric cooler (11) is stored in a battery or accumulator.

In even another embodiment, the electrolyzer (1) comprises a further, e.g. a second or third, Peltier element that heats up the water from the water source (6) before said water is introduced into the electrolyze chamber (2).

One preferred application of the thermoelectric cooler (11) is to convert heat generated during electrolysis and/or upon compressing gases into electricity. Thus, the thermoelectric cooler (11) may cool the electrolyze chamber (2) and/or the gas tank (7) while producing electricity. The generated electricity may be preferably used while operating the electrolyzer (1), e.g. the electricity may be fed into the electric power supply (9), into a separate accumulator, to power electric engines such as the gas compressor (8), pulse-width modulator (10), ultrasonic generator (12), sonotrode (13), and/or to feed the electricity into another thermoelectric cooler (11) dedicated to transform electricity into heat and thus to warm up its environment, e.g. the water source (6) in cold environment. Therefore, by incorporating a thermoelectric cooler (11), the total amount of external electricity used is reduced and the energy conversion efficiency is increased. Hence, the thermoelectric cooler (11) increases significantly the efficiency of the electrolyzer (1) according to the invention.

Thus, at least one side of at least one thermoelectric cooler (11)—if present—is connected to the electrolyze chamber (2) and/or the gas tank (7), i.e. at least most of one larger side of the thermoelectric cooler (11) has direct or indirect physical contact with the electrolyze chamber (2) and/or a gas tank (7). When the electrolyze chamber (2) is heated up, e.g. by process heat such as applied overpotentials.

The Ultrasonic Generator (12) and the Sonotrode (13)

In another particularly preferred embodiment according to the invention, the electrolyzer (1) comprises one or more ultrasonic generators (12), wherein at least one ultrasonic generator (12) is connected to at least one electrode (3,4) and/or at least one sonotrode (13), wherein the sonotrode (13), if present, and the electrodes (3,4) are placed inside the electrolyze chamber (2).

Most typically, the electrodes (3,4) and the optional sonotrode (13) are immersed in water, if present. The ultrasonic generator (12) is furthermore connected to the electric power supply (9) and the electrodes (3,4) and/or the sonotrode (13) and thus connects the electric power supply (9) with the electrodes (3,4) and/or the sonotrode (13), wherein the ultrasonic generator (12) is inside and/or outside of the electrolyze chamber (2). If the ultrasonic generator (12) is inside and outside the electrolyze chamber (2), it is preferably built into the casing (19) of the electrolyze chamber (2) and thus having a part outside and another part inside the electrolyze chamber (2).

The ultrasonic generator (12) generates ultrasound. According to the invention, the ultrasonic vibrational energy, i.e. ultrasonic vibration generated by the ultrasonic generator (12) is further transmitted to the electrodes (3,4) and/or the sonotrode (13) and thus into the electrolyze chamber (2), wherein the type of the sonotrode (13) is for water electrolysis most typically selected in accordance to the water's resonance frequency.

Hence, the employment of ultrasonic vibrational energy impinged on the electrodes (3,4) and/or the sonotrode (13) accelerates the process of electrolysis and improves the yield of gases. With other words, the efficiency of the electrodes (3,4) in terms of their gaseous output, i.e. the efficiency of the splitting of water, is enhanced by activation of the process with ultrasonic vibration, since "forcing the emerging bubbles to disengage from electrodes, membrane and electrolyte surface is known to improve the local mass and heat transfer as well as the process efficiency" as discussed by K. Mazloomi, N. Sulaiman and H. Mayedi in Int. J. Electrochem. Sci. Vol. 7, 2012, 3320, p. 8. However, the process seems to be intricate, as quick deterioration of the electrodes may result from cavitation effects. Therefore, the ultrasonic excitation of the electrodes for enhancing the gaseous output is transmitted directly to the electrodes (3,4) or via the sonotrodes (13), selected in accordance to the water's resonance frequency.

The sonotrode (13) is a tool which is put into resonant vibrations by the ultrasound generated by the ultrasonic generator (12). The sonotrode (13) is connected to the ultrasonic generator (12) and immersed in water. It may optionally further be in contact with to the membrane (5), the anode (3) and/or the cathode (4). Thus, the sonotrode (13) transmits the ultrasonic vibrational energy to water and the optionally connected devices, i.e. the membrane (5), the anode (3) and/or the cathode (4). This has the effect, that the ultrasonic vibrational energy generated by the ultrasonic generator (12) and transmitted by the sonotrode (13) reduces or even inhibits bubble cavitation and thus to facilitate the liberation of formed gas bubbles. Furthermore, the ultrasonic vibrational energy from the sonotrode (13) may also reduce or even inhibit foam generation within the electrolyse chamber (2).

The standard frequencies used with ultrasonic sonotrodes (13) range from about 20 kHz to 70 kHz. The amplitude of the vibration is small, about 13 to 130 micrometers.

Suitable Sonotrodes (13) may be made of titanium, aluminum or steel, with or without heat treatment (carbide). The shape is most typically optimized to the specifically used type and geometry of the electrolyze chamber (2), which the skilled person is capable to do. Suitable ultrasonic generators (12) and sonotrodes (13) are known to the skilled person in the art.

The Mixer (14) and Microactuator (18)

In another particularly preferred embodiment according to the invention, the electrolyzer (1) comprises a mixer to allow homogeneous concentration of the aqueous solution, i.e. to enable basically a constant concentration of the aqueous electrolyte solution through the entire aqueous phase. The mixer may be coupled to a microactuator (18), in particular to a linear microactuator, to allow increased efficiency of the mixing, or a downsizing of the mixer type, respectively.

The mixer (14) may be introduced into the electrolyze chamber (2) from the top and/or the bottom of the electrolyze chamber (2).

Suitable mixers (14) are known to the skilled person in the art and commercially available. Non-limiting examples of preferred mixers (14) include a screw blender, counter-rotating mixer, double shaft mixer, triple shaft mixer, high shear rotor stator mixer, dispersion mixer, paddle mixer, vertical mixer, planetary mixer, propeller mixer, hollow blade mixer, anchor mixer, impeller mixer and/or a hydraulic piston mixer which may be combined with a static mixer such as a static vane mixer.

Optional Further Devices of Electrolyzer (1)

The electrolyzer (1) according to the invention may comprise further devices. Preferred, non-limiting further devices include a gas purification device (15) to purify generated gas, an accumulator to store electricity obtained from the thermoelectric cooler (11), a tip of a blowtorch (16) with connecting tubes to the gas tank (7) and preferably per tube a back-pressure valve and/or a gas control valve, and/or a recuperator (17), a porous burner, a microactuator (18), in particular a linear microactuator, to support the mixer (14) and/or a casing (19), i.e. platform, to which the individual devices may be mounted. All these devices are commercially available and the skilled person is knowledgeable to select the most appropriate device according to the specific design and needs. However, the electrolyzer (1) may be equipped with additional suitable devices as well.

The optional gas purification device (15) is to purify the generated hydrogen, optionally the generated oxygen, and may also act as a liquid spark arrestor in addition—or alternatively—to the back pressure valve. Non-limiting examples of suitable gas purification devices (15) include gas washing bottles optionally comprising a washing liquid such as water, and/or the gas may be passed through e.g. molecular sieves and/or zeolites. The gas purification device (15) is ideally placed between the electrolyze chamber (2) and the gas tank (7) either before or after compressing the gas.

The optional accumulator that stores electricity obtained from the thermoelectric cooler (11) and is different from the electric power supply (9) and may be best suited to store electricity generated by the thermoelectric cooler and/or the recuperator (17), if present. Furthermore, it may be used to power e.g. the gas compressor (8), the pulse-width modulator (10), the ultrasonic generator (12), the sonotrode (13) and/or any other electrical device, if present.

The optional recuperator (17) is a heat exchanger and preferably located at the tip of a blowtorch (16) to make use of the heat generated by a burning flame and/or of the heat obtained from condensing of water. Furthermore, the design of the recuperator (17) may be optimized to collect the condensed water and feed it back to the water source (6), in particular to the water storage vessel (6a). Suitable recuperators (17) are known to the skilled person in the art and commercially available.

The optional tip of a blowtorch (16) with connecting tubes to the gas tank (7) and preferably a back-pressure valve and/or a gas control valve per tube is most typically used to burn, i.e. use or react, hydrogen stored in a gas tank (7) with oxygen. The oxygen is preferably oxygen stored in another gas tank (7), if present. The produced flame using pure oxygen may reach a temperature of up to 3080° C. and thus may melt, i.e. cut, most materials, also in high thicknesses, e.g. up to 1 m thick steel, and fast feed rates. However, if e.g. lower flame temperatures are preferred, the oxygen may also be oxygen from surrounding air to obtain a flame temperature of up to 2130° C.

Blowtorch

When the electrolyzer (1) comprises a tip of a blowtorch (16) with connecting tubes to the gas tank (7) and preferably a back-pressure valve and/or a gas control valve per tube, the electrolyzer (1) becomes a blowtorch, i.e. welding torch, blow torch, welding burner and/or welding torch. Since the electrolyzer (1) is a portable electrolyzer, i.e. mobile, also the blowtorch according to the invention is portable. Thus, the blowtorch according to the invention comprises an integrated hydrogen generation device and thus the blowtorch becomes independent from separate gas supplies. Furthermore, with said portable blowtorch, flame temperatures of up to 3080° C. may be obtained, allowing to melt, cut and/or weld most materials also in high thicknesses and at fast feed rates. Hence, the blowtorch according to the invention may well replace todays blowtorches based on acetylene.

The Process

The process according to the invention to generate hydrogen with the electrolyzer (1) according to the invention comprises the electrolysis of water in the electrolyzing chamber (2) with the anode (3) and the cathode (4) as electrodes (3,4) upon applying the electric power supply (9) and the pulse-width modulator (10), separation and release of hydrogen using a membrane (5), compressing the obtained hydrogen with the gas compressor (8) to collect said hydrogen in a gas tank (7). Furthermore, said process comprises step i), step ii) and/or step iii) in any combination as described below.

Step i) of the process to generate hydrogen with the electrolyzer (1) comprises at least one thermoelectric cooler (11) which is connected to the electrolyze chamber (2) and/or the gas tank (7), wherein process heat from the electrolyze chamber (2) and/or the gas tank (7), is transformed into electricity by the thermoelectric cooler (11) and the obtained electricity is further used while operating the electrolyzer (1), in particular by feeding said electricity back fed into the electric power supply (9), into a accumulator, in particular into a separate accumulator, to power electric engines such as the gas compressor (8), pulse-width modulator (10), ultrasonic generator (12), sonotrode (13), and/or to feed the electricity into another thermoelectric cooler (11) dedicated to transform electricity into heat and thus to warm up its environment, in particular the water source (6) in cold environment.

Step ii) of the process to generate hydrogen with the electrolyzer (1) comprises the ultrasonic generator (12) which transmits the ultrasonic vibrational energy generated to the sonotrode (13) and thus into the electrolyze chamber (2) to reduce or inhibit bubble cavitation and thus to facilitate the liberation of formed gas bubbles.

Step iii) of the process to generate hydrogen with the electrolyzer (1) comprises the mixer (14) with which the aqueous solution inside the electrolyze chamber (2) is mixed, wherein the mixer (14) is optionally coupled and accelerated by a microactuator (18), in particular a linear microactuator.

The generated hydrogen according to the process according to the invention may further be burned i) in a flame at the tip of a blowtorch (16) with oxygen from air and/or with the generated, compressed oxygen stored in a gas tank (7), i.e. oxygen gas tank (7). This process provides a hydrogen flame at high temperature of more than 2000° C.—or with pure oxygen even more than 3000° C.—with which at fast feed rates materials even at high thicknesses may be melt, cut and/or welded. Alternatively—or in addition—the generated hydrogen may be burned ii) in a porous burner. Such porous burners are typically flameless burners and generate heat. Hence, upon employing the process of the invention, the generated hydrogen may thus be further burned for automotive or domestic heating. Such porous burners are known the skilled person in the art and are commercially available.

The Uses

A particularly preferred use of the electrolyzer (1) according to the invention is for energy-efficient hydrogen generation by electrolysis at small scale. Furthermore, the electrolyzer (1) according to the invention and the hydrogen generated and stored according to the process according to the invention are most preferably used for welding with a hydrogen flame, in particular with the tip of the blowtorch (16), to convert electricity from e.g. renewable energies, such as photovoltaic elements, into hydrogen and thus to store said converted electricity in the form of hydrogen and optionally oxygen, wherein the stored hydrogen may optionally be further used at any time to convert the hydrogen back into electricity e.g. in fuel cell. Such a fuel cell may be placed close to the electrolyzer (1), e.g. in a house, or it may be placed at any location, such as part of the engine of a car. Furthermore, the electrolyzer (1) may be used e.g. for heat generation by burning hydrogen in a porous, e.g. flameless, burner and thus to warm up e.g. sections in automotives, engines and/or domestic environments.

In the following figures described are non-limiting embodiments shown, which are not restricting or narrowing the invention. These explanations are part of the description:

FIG. 1 shows a schematic view of the electrolyzer (1) comprising the electrolyze chamber (2) with the anode (3) and the cathode (4), wherein each electrode (3,4) is connected to the electric power supply (9) via a pulse-width modulator (10). In this embodiment, the membrane (5) divides the electrolyze chamber (2) into two sections comprising an electrode (3,4). Furthermore, each section of the electrolyze chamber (2) comprises a sonotrode (13), which is linked via an ultrasonic generator (12) to the electric power supply (9).

The water source (6), e.g. a water storage vessel (6a), is connected to each section of the electrolyze chamber (2). Means for regulating the water feed are not shown. The gases obtained from the electrolysis, i.e. hydrogen and oxygen, are discharged with the aid of gas compressors (8) into the gas tanks (7). According to the invention, it is also possible just to collect formed hydrogen and release the formed oxygen into the environment (not shown).

The electrolyzer (1) of FIG. 1 further comprises a thermoelectric cooler (11) attached to the bottom of the electrolyze chamber (2).

Potential further thermoelectric coolers (11) are attached to the gas tanks (7) to remove heat from the compression of the gas.

Additionally, a thermoelectric cooler (11) may be connected to the water storage vessel (6a; not shown) to warm up cold water, in case of freezing temperatures. Thus, the thermoelectric coolers (11) allow process heat conversion into electricity or vice versa. Hence, the thermoelectric coolers (11) may be linked to the electric power supply (9) as indicated in FIG. 1, to a separate accumulator or to another thermoelectric cooler (11) designated to perform the reverse effect (not shown).

Figure 2:
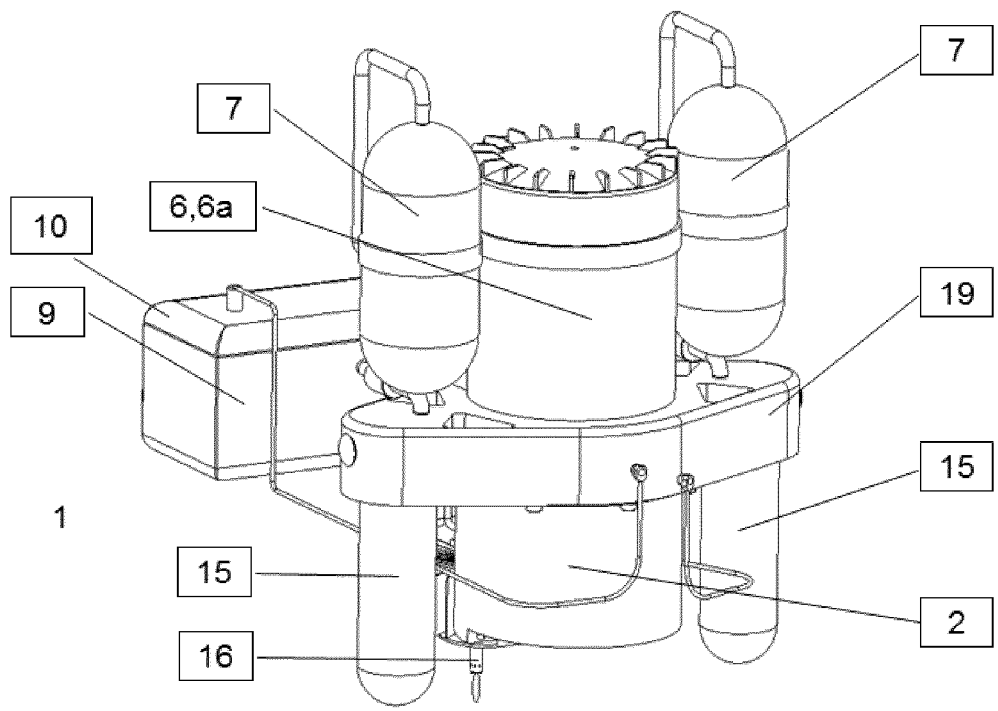

FIG. 2 shows an outside view of one, non-limiting embodiment of the electrolyzer (1) according to the invention with main components visible from outside. At the bottom of the electrolyze chamber (2), which contains the processing unit, is a thermoelectric cooler (11) mounted (not shown). To the left and right of the electrolyze chamber (2) are gas purification devices (15), i.e. gas scrubbers, mounted to the casing, i.e. platform (19). Above said platform (19) the water source (6, 6a), e.g. a water storage vessel (6a) comprising a reservoir of e.g. demineralized water, is arranged, cupped by a master lid with cooling fins. Adjacent to the water storage vessel (6a) are the gas tanks (7) arranged. The electric power supply (9), e.g. the battery or accumulator, is connected to the pulse-width modulator (10) and connected via cables to the electrodes (3,4) placed inside the electrolyze chamber (2) of the electrolyzer (1).

At the bottom rear of the electrolyzer (1) is the tip of a blowtorch (16) visible with a flame indicated. Thus, the electrolyzer (1) becomes a blowtorch.

Figure 3:
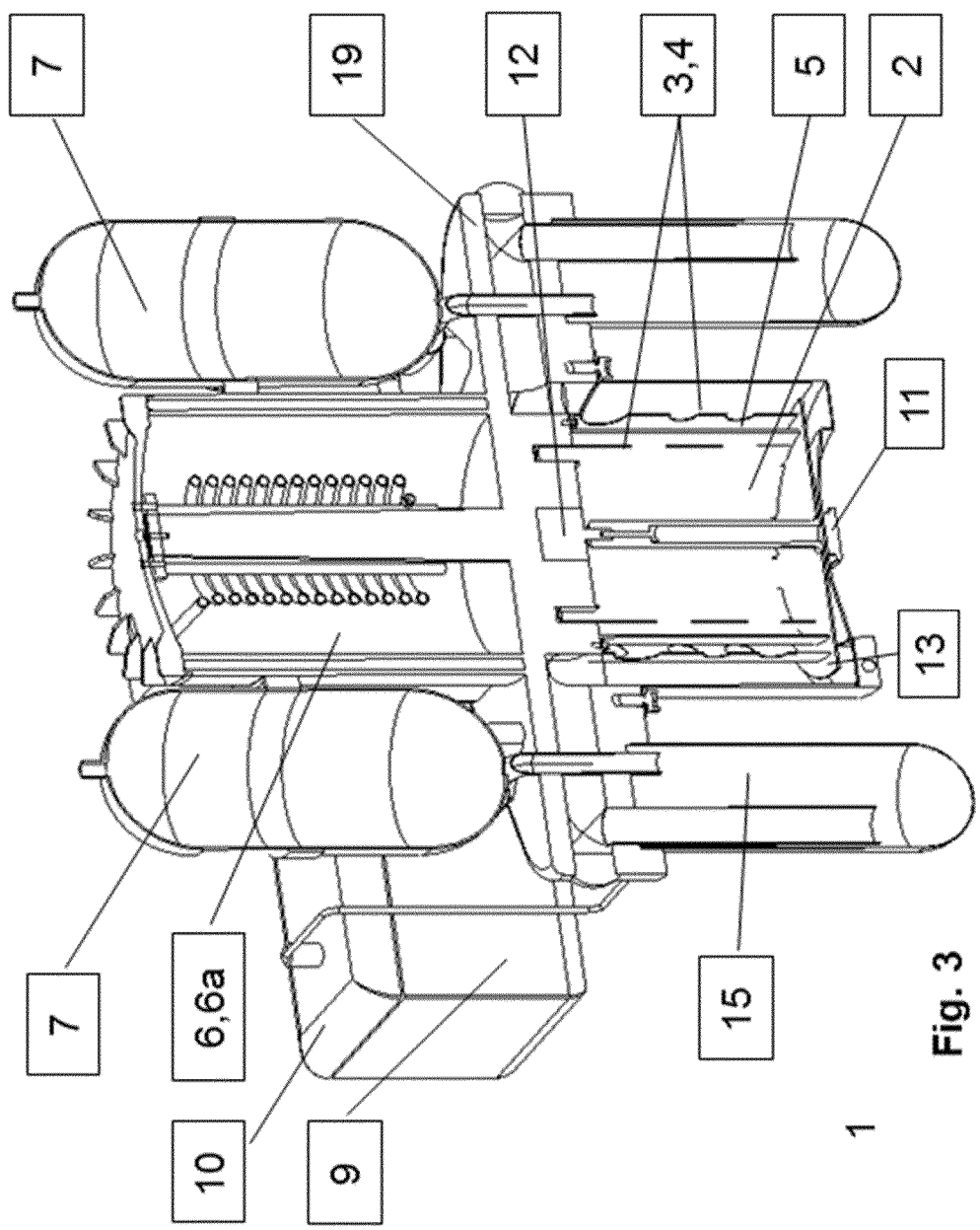

FIG. 3 is a cross-section of the electrolyzer (1) shown in FIG. 2. The water storage vessel (6a) comprises coils for e.g. warming up freezing water, e.g. by a heat exchanger, a thermoelectric cooler (11) and/or by directing compressed, heated up gas. To the bottom part of the casing (19), i.e. platform, i.e. base, is the electrolyze chamber (2) mounted comprising the cathode (4), the ion exchange membrane (5), the anode (3)

comprising apertures, and the thermoelectric cooler, i.e. Peltier element (11). In this figure, the electrodes (3,4) are designed as cylinder electrodes having different diameters and arranged one inside the other. The electric power supply (9) and the pulse-width modulator (10) are located at the rear of the casing (19).

Furthermore, the ultrasonic generator (12), i.e. ultrasonic transducer, is arranged about in the lower central part of the casing (19), and connected to the sonotrode (13). The sonotrode (13) is—in this design—placed towards the bottom of the electrolyze chamber (2), wherein the membrane (5) and the electrodes (3,4), which are all fixed at their top to the casing (19), are placed above the sonotrode (13). With other words: The diameter of the planer, areal part of the sonotrode (13) is close to the diameter of the electrolyze chamber (2) and thus even larger than the diameter of the wider electrode (3,4).

This arrangement allows to transmit the ultrasonic vibrational energy from the sonotrode (13) easily to all sections of the electrolyze chamber (2).

At the bottom left and the bottom right side of the casing (19) are the gas purification devices (15) arranged, which allow cleansing of the gas which is conveyed through. Said gas is further processed, e.g. compressed into the gas tanks (7), which are arranged at the upper left and upper right side of the casing (19).

Figure 4:
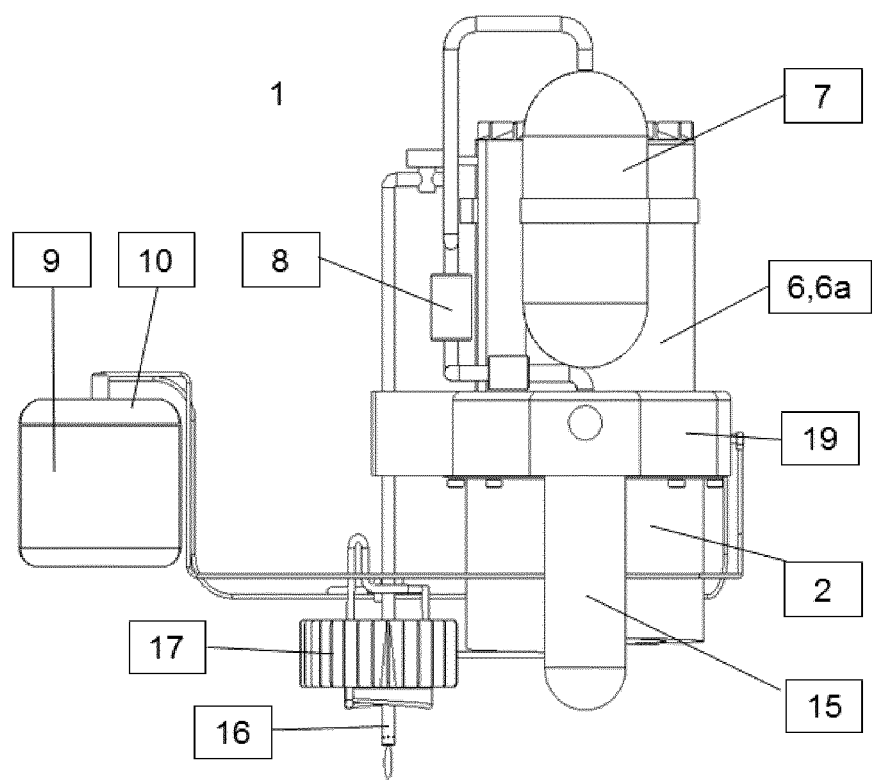

FIG. 4 shows an outside side-view of the electrolyzer (1) comprising the electrolyze chamber (2) and a gas purification device (15) attached to the casing (19). On the upper side of the casing (19) is the water source (6), e.g. the water storage vessel (6a), and a gas tank (7) arranged. The gas, e.g. hydrogen, produced in the electrolyze chamber (2) passes through the gas purification device (15) and is further compressed by the gas compressor (8) and fed into the gas tank (7) for storage. On the left side of the electrolyzer (1) is the power supply (9) with the pulse-width modulator (10) arranged, which both are coupled via cables to the electrodes (3,4) inside the electrolyze chamber (2). Cables from the power supply (9) to other electric engines, such as the gas compressor (8), are not shown.

From said gas tank (7), the stored hydrogen gas can be passed through connecting tubes and preferably a back-pressure and/or gas control valve (not shown) to the tip of a blowtorch (16), which may comprise a recuperator (17), for welding with a hydrogen flame (as shown) or for heat generation by burning hydrogen in a porous burner e.g. for automotive, engine and/or housing applications (not shown).

Figure 5:
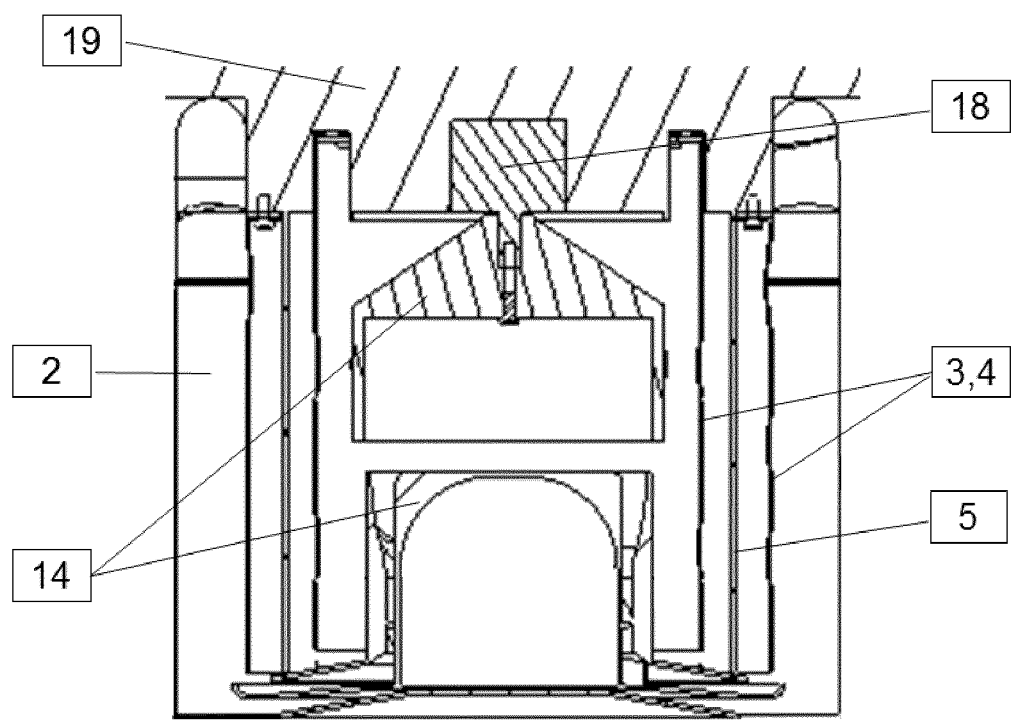

FIG. 5 shows a detailed view of another embodiment of an electrolyze chamber (2) of the electrolyzer (1). The anode (3) and the cathode (4) are designed as cylinder electrodes (3,4) having different diameters and arranged one inside the other, wherein the membrane (5) is located between the electrodes (3,4). The electrolyze chamber (2) comprises a mixer (14), wherein said mixer comprising as upper part a hydraulic piston mixer (14) which is combined with a static vane mixer (14) as lower part. A microactuator (18), e.g. a linear microactuator, is located in the casing (19) and connected to the hydraulic piston mixer (14) to allow increased efficiency of the mixing, or a downsizing of the mixer type, respectively.

Figure 6:
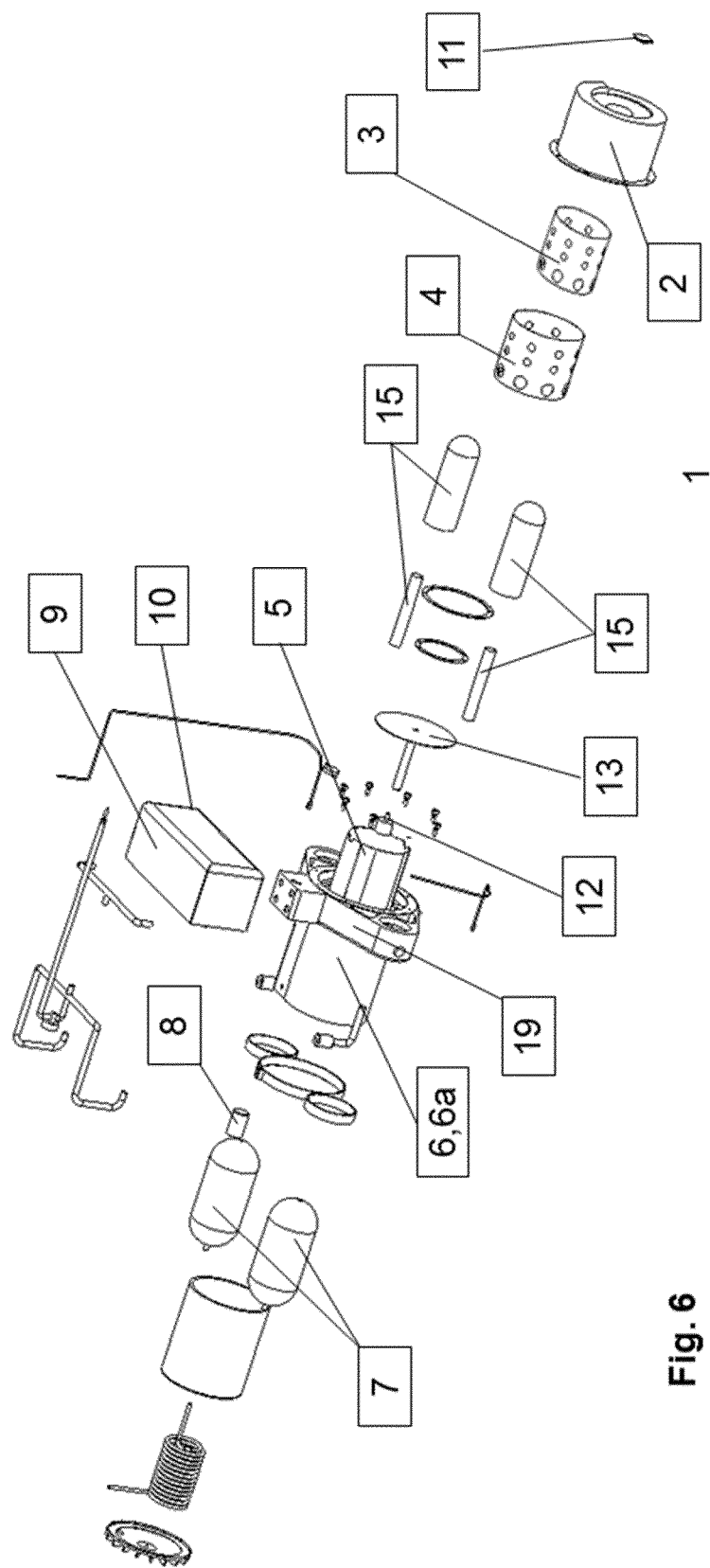

FIG. 6 shows an exploded drawing of the various parts of one non-limiting embodiment of the electrolyzer (1). From left to right are the cover of the water storage vessel (6a) shown, i.e. master lid with cooling fins, heating/cooling spirals and an insulation mantle for the water storage vessel (6a), two gas tanks (7), a gas compressor (8), fixation means for the gas tanks (7), a water storage vessel (6a) with fittings to gas pipes, the casing (19) with the membrane (5) and an ultrasonic generator (12), the electric power supply (9) and the pulse-width modulator (10), power cables and screws, the sonotrode (13), two sealings, two gas purification devices (15), wherein the smaller tube is to be placed inside the coarser one, the cathode (4) and the anode (3), the electrolyzer chamber (2) and finally a thermoelectric cooler (11). Moreover, the connecting gas pipes may comprise servo-valves and spark arrestors (not shown), together with the operating gas pump, i.e. gas compressor (8) and the pressure gauge.

Figure 7A:
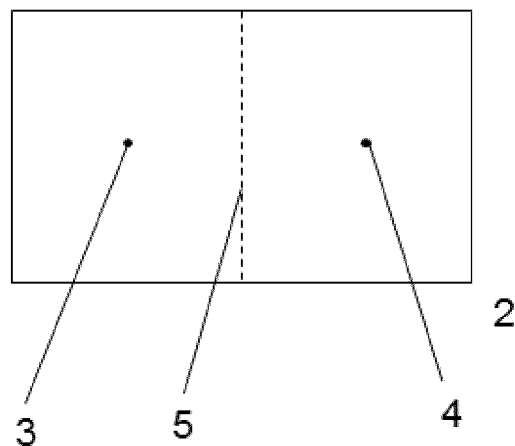
Figure 7B:
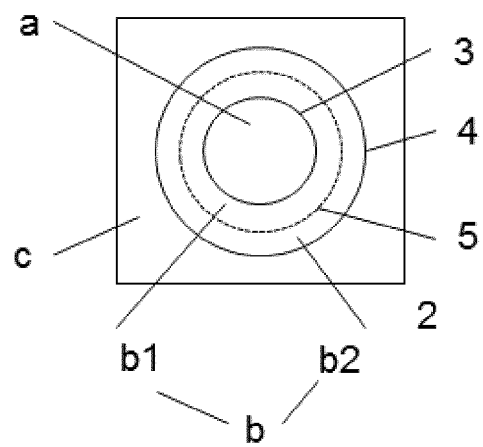
Figure 7C:
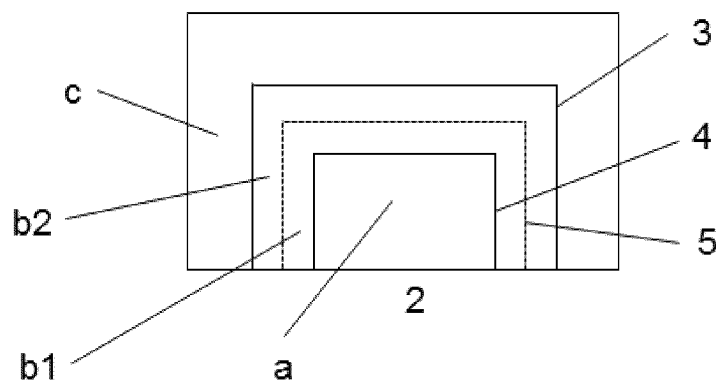

FIGS. 7a-7c show different, non-limiting design options for the electrolyze chamber (2) comprising a membrane (5), an anode (3) and a cathode (4). FIG. 7a shows a well-known design with one membrane (5) dividing the electrolyze chamber (2) into one section comprising the anode (3) and another section comprising the cathode (4). FIG. 7b shows a design with cylinder electrodes (3,4) with a circular membrane (5) in between. FIG. 7c shows a design with rectangular electrodes (3,4) with a rectangular membrane in between. In the FIG. 7b and FIG. 7c is the electrolyze chamber (2) divided into an inner section a), an intermediate section b) and an outer section c).

Furthermore, by placing the membrane (5) essentially in parallel between the electrodes (3,4), the intermediate section b) is further divided into an inner intermediate section $b_1$) between the membrane (5) and the inner electrode (3,4) and an outer intermediate section $b_2$) between the membrane (5) and the outer electrode (3,4).

The invention claimed is:

1. A portable water electrolyzer comprising:
an electrolyze chamber with an anode and a cathode as electrodes;
at least one membrane;
a water source;
at least one gas tank;
at least one gas compressor;
an electric power supply providing an electrical potential of around 1.23V; and
a pulse-width modulator,
wherein the electrolyzer further comprises:
  i) optionally one or more thermoelectric coolers, wherein one side of the thermoelectric cooler is directly attached to the electrolyze chamber and/or a gas tank;
  ii) one or more ultrasonic generators, wherein at least one ultrasonic generator is connected to at least one electrode and at least one sonotrode, wherein the sonotrode and the electrodes are placed inside the electrolyze chamber; and
  iii) optionally a mixer capable of mixing the aqueous phase inside the electrolyze chamber,
wherein the electrodes are cylinder electrodes having different diameters which are arranged concentrically around each other with one inside the other electrode, wherein the cylinder electrodes are in the form of punctuated hollow cylinders, and
wherein the electrolyze chamber has a volume of from about 0.1 dm$^3$ to about 0.5 m$^3$.

2. The electrolyzer according to claim 1, where the electrodes exhibit a thin-walled areal shape, wherein one electrode is arranged around the other electrode and thus dividing the electrolyze chamber into:
- an inner section confined essentially by the other electrode and optionally part of the wall of the electrolyze chamber;
- an intermediate section between the electrodes and optionally part of the wall of the electrolyze chamber; and
- an outer section confined by the one electrode and at least part of the wall of the electrolyze chamber;
- wherein, when the electrolyze chamber comprises water, all sections comprise water.

3. The electrolyzer according to claim 2, wherein the membrane is placed inside the intermediate section of the electrolyze chamber and thus dividing the intermediate section into an inner intermediate section between the membrane and the inner electrode and an outer intermediate section between the membrane and the outer electrode.

4. The electrolyzer according to claims 1, wherein the electrolyzer further comprises:
- a gas purification device to purify generated gas;
- an accumulator to store electricity obtained from the thermoelectric cooler;
- a tip of a blowtorch with connecting tubes to the gas tank;
- a recuperator;
- a porous burner;
- a microactuator; and/or
- a casing.

5. The electrolyzer according to claim 1, wherein the membrane is a semipermeable membrane or diaphragm suitable for electrolysis, and/or a gas separating membrane.

6. The electrolyzer according to claim 1, wherein at least most of one larger side of the thermoelectric cooler has physical contact with the electrolyze chamber and/or a gas tank.

7. The electrolyzer according to claim 1, wherein the ultrasonic generator connects to the electric power supply with the sonotrode, wherein the ultrasonic generator is inside and/or outside of the electrolyze chamber.

8. The electrolyzer according to claim 1, wherein the electrolyze chamber comprises a polymer electrolyte membrane (PEM) and/or an aqueous electrolyte solution or an acidic aqueous solution.

9. The electrolyzer according to claim 1, wherein the electrolyze chamber has a volume of from about 0.5 dm$^3$ to about. 0.2 m$^3$.

10. The electrolyzer according to claim 1, wherein the electric power supply is a battery, an accumulator, a power outlet and/or one or more photovoltaic elements.

11. The electrolyzer according to claim 1, wherein the mixer is a screw blender, counter-rotating mixer, double shaft mixer, triple shaft mixer, high shear rotor stator mixer, dispersion mixer, paddle mixer, vertical mixer, planetary mixer, propeller mixer, hollow blade mixer, anchor mixer, impeller mixer and/or a hydraulic piston mixer which may be combined with a static mixer such as a static vane mixer.

12. A process to generate and store hydrogen with the electrolyzer according to claim 1, wherein water is electrolyzed in the electrolyze chamber with the anode and the cathode as electrodes upon applying the electric power supply and the pulse-width modulator, separating and releasing hydrogen using the at least one membrane, compressing the obtained hydrogen with the at least one gas compressor to collect said hydrogen in the at least one gas tank, wherein
- i) optionally at least one thermoelectric cooler is connected to the electrolyze chamber and/or the gas tank, wherein process heat from the electrolyze chamber and/or the gas tank is transformed into electricity by the thermoelectric cooler and the obtained electricity is further used while operating the electrolyzer to power electric engines, and/or to feed the electricity into another thermoelectric cooler dedicated to transform electricity into heat and thus to warm up its environment,
- ii) the ultrasonic generator transmits the ultrasonic vibrational energy generated to the sonotrode and thus into the electrolyze chamber to reduce or inhibit bubble cavitation and thus to facilitate the liberation of formed gas bubbles, and
- iii) optionally the mixer mixes the aqueous solution inside the electrolyze chamber, wherein the mixer is optionally coupled and accelerated by a microactuator.

13. The process according to claim 12, wherein the generated and stored hydrogen is further burned i) in a flame at the tip of a blowtorch with oxygen from air and/or with the generated, compressed oxygen stored in a gas tank, and/or ii) in a porous burner.

14. A method of using the hydrogen generated and stored according to the process of claim 12 for welding with a hydrogen flame, to convert electricity from renewable energies into hydrogen and thus to store said converted electricity in the form of hydrogen and optionally oxygen and/or for heat generation by burning hydrogen in a porous burner.

15. A blowtorch comprising:
- the electrolyzer of claim 1; and
- a tip of a blowtorch with connecting tubes to the gas tank.

16. The electrolyzer according to claims 2, wherein the electrolyzer further comprises:
- a gas purification device to purify generated gas;
- an accumulator to store electricity obtained from the thermoelectric cooler;
- a tip of a blowtorch with connecting tubes to the gas tank and preferably per tube a back-pressure valve and/or a gas control valve;
- a recuperator;
- a porous burner;
- a microactuator, in particular a linear microactuator; and/or a casing.

17. The electrolyzer according to claims 3, wherein the electrolyzer further comprises:
- a gas purification device to purify generated gas;
- an accumulator to store electricity obtained from the thermoelectric cooler;
- a tip of a blowtorch with connecting tubes to the gas tank and preferably per tube a back-pressure valve and/or a gas control valve;
- a recuperator;
- a porous burner;
- a microactuator, in particular a linear microactuator; and/or
- a casing.

18. The electrolyzer according to claim 2, wherein the membrane is a semipermeable membrane or diaphragm suitable for electrolysis, and/or a gas separating membrane.

19. The electrolyzer according to claim 3, wherein the membrane is a semipermeable membrane or diaphragm suitable for electrolysis, and/or a gas separating membrane.

20. The electrolyzer according to claim 4, wherein the membrane is a semipermeable membrane or diaphragm suitable for electrolysis, and/or a gas separating membrane.

* * * * *